(12) United States Patent
Clark et al.

(10) Patent No.: US 9,071,564 B2
(45) Date of Patent: Jun. 30, 2015

(54) DATA SYNCHRONIZATION USING MAIL AND PUSH NOTIFICATION SERVICES

(75) Inventors: Ashley Barton Clark, San Francisco, CA (US); Cristobal Baray, Sunnyvale, CA (US); Todd Allan Shortlidge, San Francisco, CA (US)

(73) Assignee: Apple Inc., Cupertino, CA (US)

(*) Notice: Subject to any disclaimer, the term of this patent is extended or adjusted under 35 U.S.C. 154(b) by 232 days.

(21) Appl. No.: 13/491,511

(22) Filed: Jun. 7, 2012

(65) Prior Publication Data

US 2013/0332538 A1  Dec. 12, 2013

(51) Int. Cl.
*G06F 15/16* (2006.01)
*H04L 12/58* (2006.01)

(52) U.S. Cl.
CPC ............... *H04L 51/14* (2013.01); *H04L 51/38* (2013.01)

(58) Field of Classification Search
CPC ......... H04L 67/04; H04L 51/38; H04L 67/26; H04L 12/587
See application file for complete search history.

(56) References Cited

U.S. PATENT DOCUMENTS

| 5,943,498 | A | * | 8/1999 | Yano et al. | 717/128 |
| 5,946,498 | A | | 8/1999 | Chiang et al. | |
| 2002/0143866 | A1 | | 10/2002 | Lewis et al. | |
| 2008/0034315 | A1 | * | 2/2008 | Langoulant et al. | 715/780 |
| 2008/0256206 | A1 | * | 10/2008 | Lee et al. | 709/206 |
| 2008/0270547 | A1 | | 10/2008 | Glickstein et al. | |
| 2009/0181705 | A1 | * | 7/2009 | Yin | 455/466 |
| 2011/0040895 | A1 | | 2/2011 | Griffin et al. | |
| 2011/0250909 | A1 | * | 10/2011 | Mathias et al. | 455/466 |
| 2011/0289172 | A1 | | 11/2011 | Marcellino | |
| 2011/0295958 | A1 | | 12/2011 | Liu et al. | |
| 2012/0290740 | A1 | * | 11/2012 | Tewari et al. | 709/248 |
| 2013/0055099 | A1 | * | 2/2013 | Yao et al. | 715/739 |

FOREIGN PATENT DOCUMENTS

EP  1 898 597  9/2006

OTHER PUBLICATIONS

International Search Report and Written Opinion of the International Searching Authority, PCT Application Serial No. PCT/US2013/039132, Aug. 6, 2013, 10 pp.

* cited by examiner

*Primary Examiner* — Djenane Bayard
(74) *Attorney, Agent, or Firm* — Fish & Richardson P.C.

(57) ABSTRACT

Systems, methods, and computer program products for data synchronization across multiple devices using mail and push notification services is disclosed.

20 Claims, 3 Drawing Sheets

DATA SYNCHRONIZATION USING MAIL AND PUSH NOTIFICATION SERVICES

TECHNICAL FIELD

This disclosure is related generally to data synchronization across multiple devices.

BACKGROUND

Many modern mobile devices allow users to create and edit documents, such as notes. Often a user would like to "synchronize" data between two or more devices. It is desirable to have a system architecture that can synchronize data across multiple devices with reduced delay.

SUMMARY

Systems, methods, and computer program products for data synchronization across multiple devices using mail and push notification services is disclosed.

In some implementations, a method comprises: receiving a request to register a mailbox for a push event from an application; sending a token for the registered mailbox to the application; requesting a push event for the registered mailbox from a mail server; receiving a push notification for the registered mailbox from a push notification server, the push notification indicating that the registered mailbox has changed; and sending the push notification to the application using the token.

In some implementations, a method comprises: sending a request for a list of mailboxes to a mail server; receiving the list of the mailboxes from the mail server; registering the mailboxes with a mail client; receiving a token for a registered mailbox from the mail client; receiving a push notification for the registered mailbox from the mail client indicating a change in the registered mailbox; and using the token to request an update to the changed mailbox from the mail server.

In some implementations, a method comprises: receiving a request for a list of mailboxes from an application; sending the list of mailboxes to the application; receiving a request for push events, for mailboxes in the list, from a mail client that is in communication with the application; sending push event information to the mail client, including a subset of mailboxes from the list for which push notifications are available; sending a request for a push notification to a push notification server for the subset of mailboxes; in response to a push notification for a changed mailbox in the subset of mailboxes, receiving a request for an update for the changed mailbox from the application; and sending the requested update to the application.

Other implementations can include systems, apparatuses and computer-readable mediums whether or not such implementations are included in the original claims of this specification.

Particular implementations disclosed herein provide one or more of the following advantages. An architecture that includes a mail server and push notification server is configured, together with a client mail application and data access daemon, to synchronize data across multiple devices with reduced delay.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Exemplary Data Synchronization System

Figure 1:
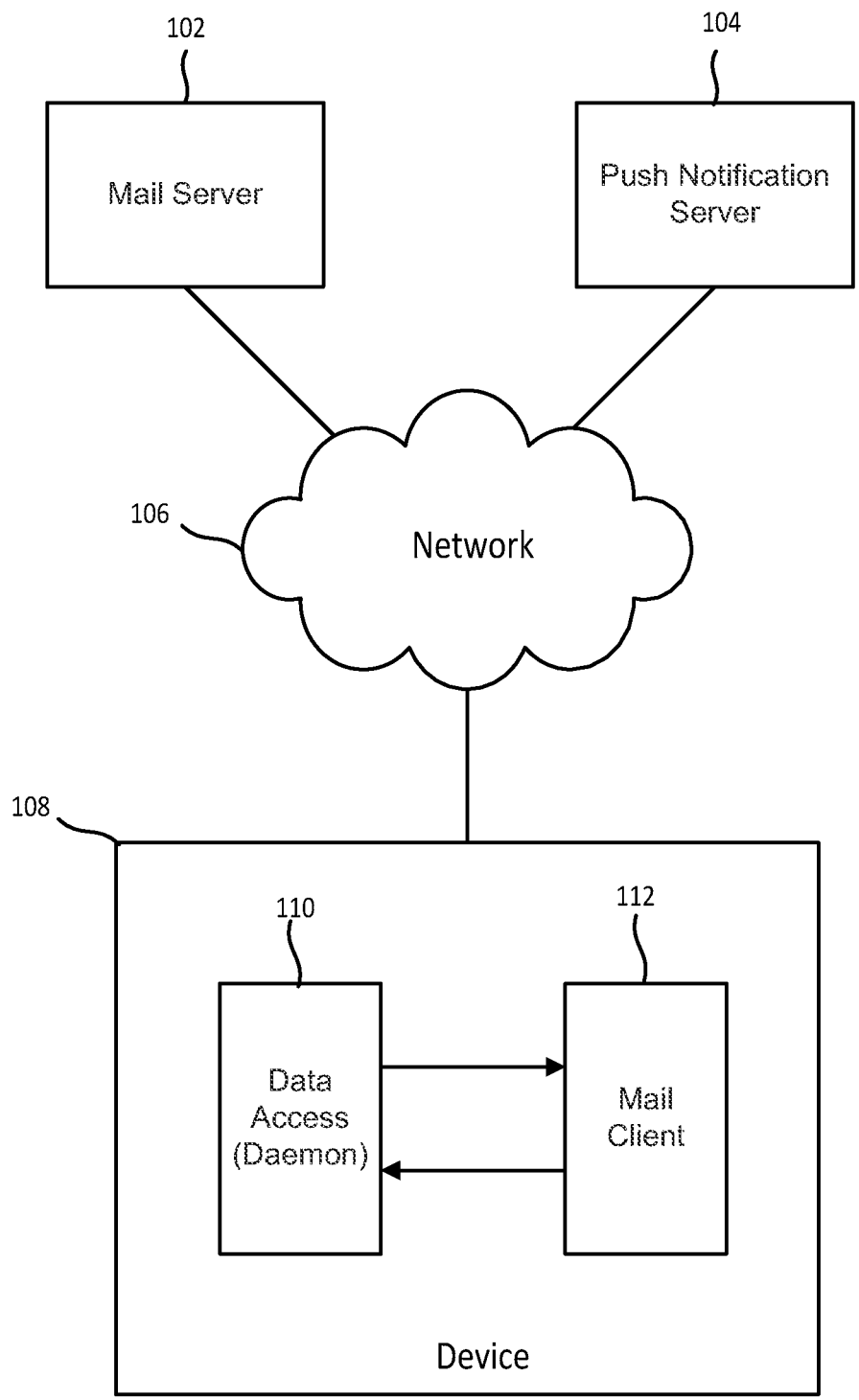
FIG. 1 is a block diagram of an exemplary data synchronization system that uses mail and push notification services.

FIG. 1 is a block diagram of an exemplary data synchronization system 100 that uses mail and push notification services. In some implementations, system 100 can include mail server 102, push notification server 104 and client device 108. Servers 102 and 104 can communicate with each other and with client device 108 through network 106.

Servers 102, 104 can be implemented by one or more server computers. Mail Server 102 can implement Internet Message Access Protocol (IMAP). Network 106 can include any number of wireless or wired networks, including local area networks and wide area networks (e.g., the Internet). Client device 108 can be any device, mobile or stationary, that is capable of communicating with network 106 using any suitable communication protocol. Some examples of client device 108 include but are not limited to a desktop or notebook computer, a smart phone or e-mail device, an electronic tablet, a game console and a television set top box or other appliance.

In some implementations, client device 108 can include data access daemon 110 (hereafter "DA 110") and mail client 112. DA 110 monitors changes to mailboxes for one or more applications. If an application (e.g., a notes application) requests updates, DA 110 is called (e.g., through Application Programming Interface (API)) to fetch the updates for the application. Mail client 112 can be any known push e-mail application (e.g., a client application that supports IMAP) in which new email is actively transferred (pushed) by mail server 102 to mail client 112.

Although only one device 108 is shown in FIG. 1 for illustrative purposes, any number of client devices can be coupled to system 100. An exemplary architecture of client device 108 is described in reference to FIG. 3.

In an exemplary use scenario, the synchronization of documents is automatically initiated when a client application that requires synchronization of electronic documents is launched on client device 108. An example client application is a notes application that allows a user to take notes on their mobile device. The client application can access data for synchronization using DA 110. When the user launches the notes application, the notes are automatically and transparently synchronized using system 100 and the process described in reference to FIG. 2.

Exemplary Data Synchronization Process

Figure 2:
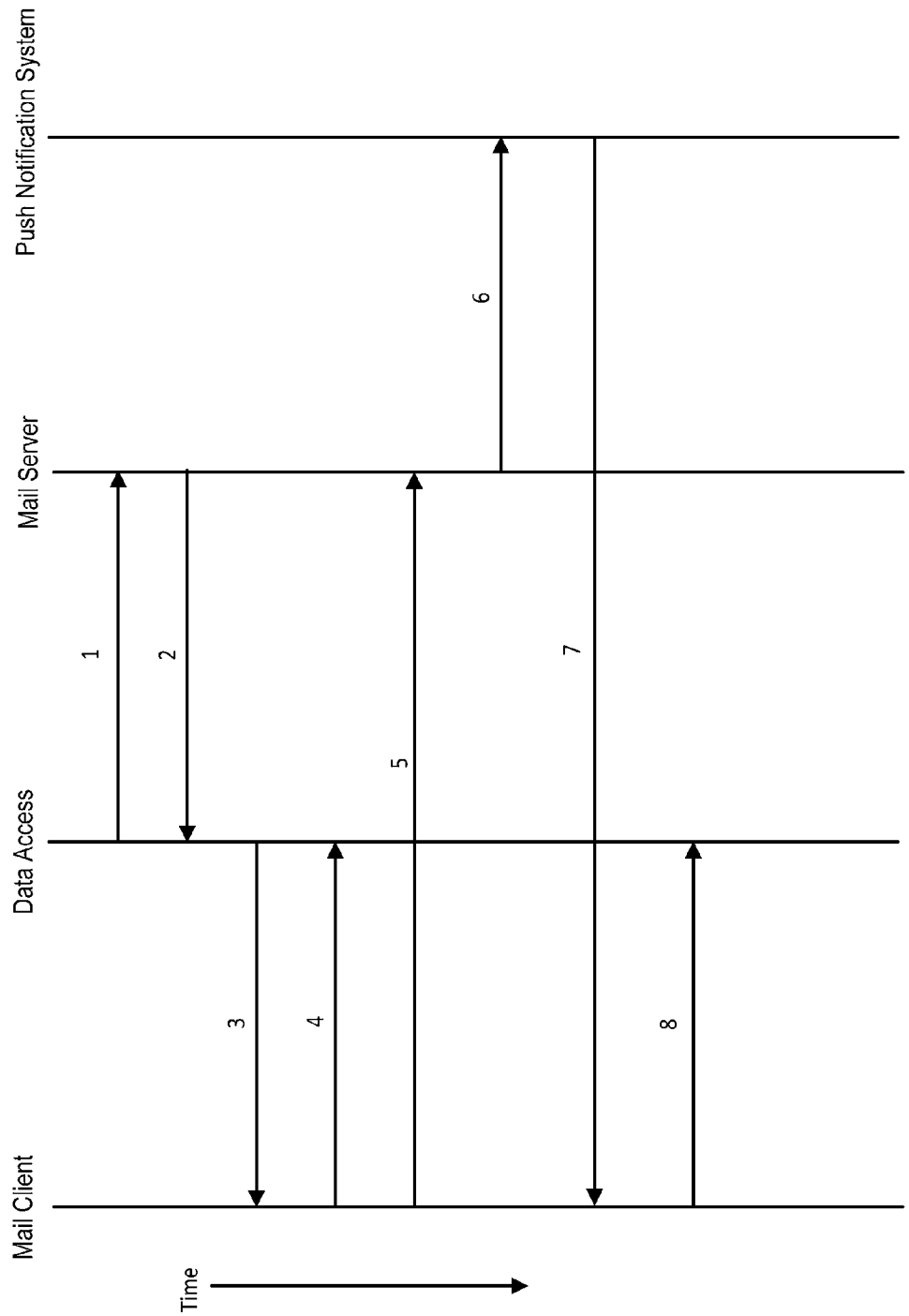
FIG. 2 is an event diagram of exemplary data synchronization process that uses mail and push notification services.

FIG. 2 is an event diagram of exemplary data synchronization process that uses mail and push notification services. The process 200 can be implemented by system 100. Each event is labeled with a number for clarity. FIG. 2 will be discussed with reference to system 100 of FIG. 1.

During event 1, DA 110 sends a request to mail server 102 for a list of mailboxes of interest. Mailboxes are data structures for storing e-mail. Mailboxes can also store other data, such as notes. During event 2, mail server 102 responds by sending the list of mailboxes to DA 110.

During event 3, DA 110 registers the mailboxes of interest (e.g., mailboxes with notes) with mail client 112 for push events. During event 4, mail client 112 responds by sending a token for each mailbox to DA 110. During event 5 (which can be at the same time as event 4), mail client 112 contacts mail server 102 (e.g., through a different connection) and requests a push event for each registered mailbox. Mail client 112 provides an account ID and device token to mail server 102. Server 102 stores those values.

The account ID can be a unique random string that is chosen when the mail account was setup on device 108. The device token can be a unique identifier that identifies device 108 to push notification server 104. The account ID and device token uniquely identify a single mail account on device 108.

In some implementations, mail client 112 may send local notifications to DA 110 on a schedule, acting as if push notifications had arrived from push notification server 104 for those mailboxes for which push notifications were unavailable.

During event 6, when a registered mailbox changes, mail server 102 sends a request to push notification server 104 for push events for the registered mailboxes. The request can include the account ID, device token and the mailboxes received during event 5.

During event 7, which immediately follows event 6, a push notification is sent by push notification server 104 to mail client 112 for the changed mailbox. During event 8, mail client 112 sends the push notification for the changed mailbox to DA 110 using the assigned token for that mailbox. In response to the push notification, DA 110 performs a sync of the mailbox that corresponds to the token following standard IMAP synchronization rules to download new messages in the mailbox, update flags of existing messages and remove messages that are no longer present.

In some cases, push notification server 104 may only retain the last N messages in a notification queue while device 108 is unreachable. If N+1 or more notifications arrive the oldest notifications may be lost or dropped due to the size limit of the notification queue. Accordingly, if push notifications are retained in the notification queue on push notification server 104 (e.g., when device 108 is off), then when device 108 is detected again by push notification server 104, device 108 can receive the notifications in the queue. The first notification out of the queue can include data (e.g., a flag set) indicating that the notifications were retained on push notification server 104 while device 108 was unavailable. When mail client 112 receives the flagged notification, mail client 112 generates local notifications that can include each of the registered mailbox tokens. Local notifications are a broadcast mechanism on device 108 for notifying other local processes on device 108. The notifications have no payload and can be arbitrary strings.

In some implementations, DA 110 can be informed of the local notifications so that it can look for missed changes. Informing DA 110 of local notifications can be used in systems where not all data from all the notifications is retained on push notification server 104. Rather, in such systems only the data from the last notification is delivered and other notifications (along with their payload) are dropped. Accordingly, if notifications were retained one of the retained notifications may have contained information to update a mailbox that the final notification no longer has. In these types of systems, DA 110 be informed of the local notifications and in response, synchronize all of its monitored mailboxes to ensure that all updates to mailboxes have been processed.

The process described above allows the use of mail and push notification services to synchronize data across multiple devices with reduced delay.

Exemplary Device Architecture

Figure 3:
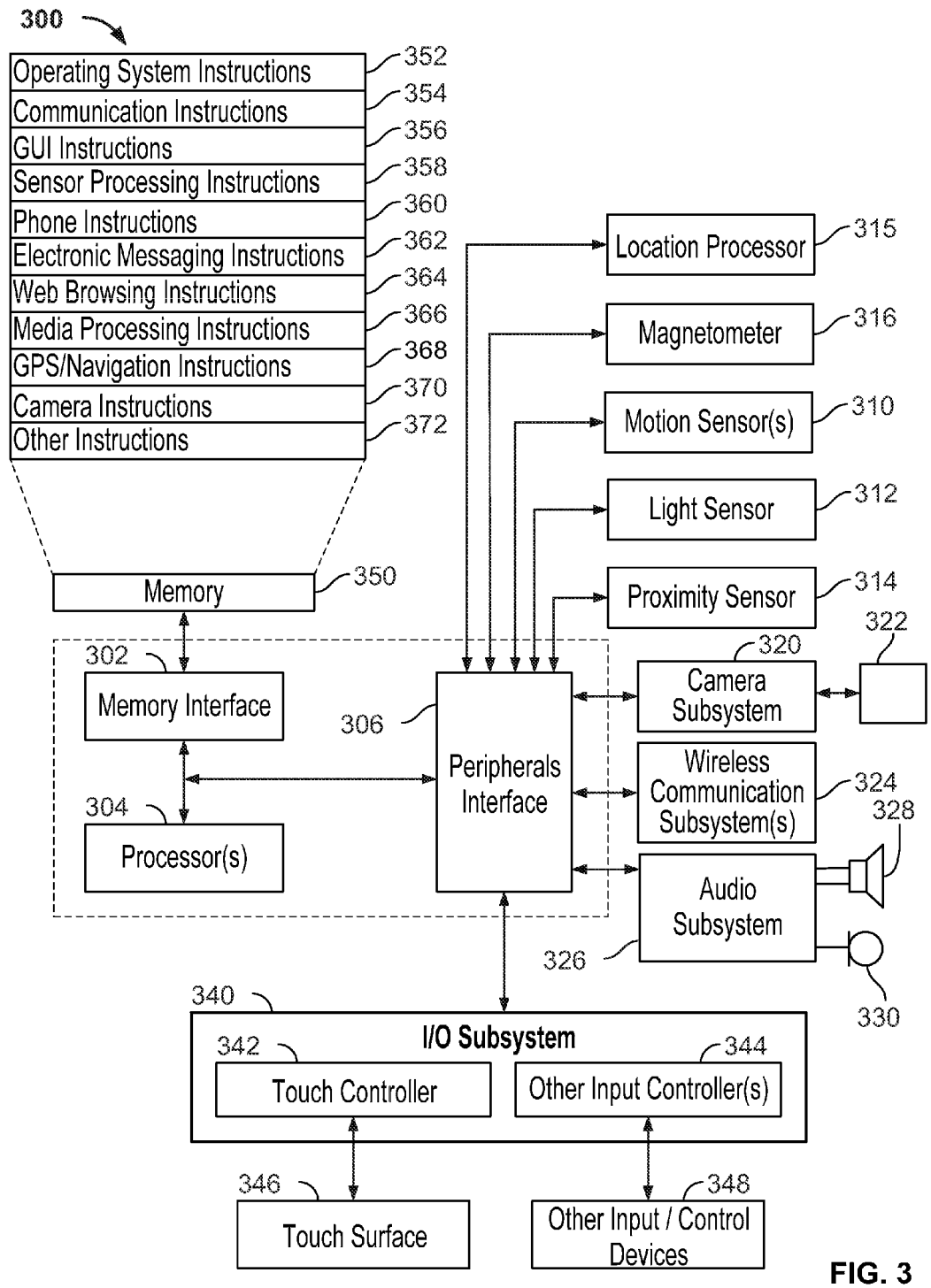
FIG. 3 is a block diagram of an exemplary architecture of a client device that uses the data synchronization system and process of FIGS. 1 and 2.

FIG. 3 is a block diagram of an exemplary architecture of a client device that uses the data synchronization system and process of FIGS. 1 and 2.

Architecture 300 can be implemented in any device, including but not limited to portable or desktop computers, smart phones and electronic tablets, television systems, game consoles, kiosks and the like. Architecture 300 can include memory interface 302, data processor(s), image processor(s) or central processing unit(s) 304, and peripherals interface 306. Memory interface 302, processor(s) 304 or peripherals interface 306 can be separate components or can be integrated in one or more integrated circuits. The various components described above can be coupled by one or more communication buses or signal lines.

Sensors, devices, and subsystems can be coupled to peripherals interface 306 to facilitate multiple functionalities. For example, motion sensor 310, light sensor 312, and proximity sensor 314 can be coupled to peripherals interface 306 to facilitate orientation, lighting, and proximity functions of the device. For example, in some implementations, light sensor 312 can be utilized to facilitate adjusting the brightness of touch surface 346. In some implementations, motion sensor 310 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 306, such as a temperature sensor, a biometric sensor, or other sensing device, to facilitate related functionalities.

Location processor 315 (e.g., GPS receiver) can be connected to peripherals interface 306 to provide geo-positioning. Electronic magnetometer 316 (e.g., an integrated circuit chip) can also be connected to peripherals interface 306 to provide data that can be used to determine the direction of magnetic North. Thus, electronic magnetometer 316 can be used as an electronic compass.

Camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 324. Communication subsystem(s) 324 can include one or more wireless communication subsystems. Wireless communication subsystems 324 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 324 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 324 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 326 can be coupled to a speaker 328 and one or more microphones 330 to facilitate voice-enabled functions, such as voice recognition, voice replication, digital recording, and telephony functions.

I/O subsystem 340 can include touch controller 342 and/or other input controller(s) 344. Touch controller 342 can be coupled to a touch surface 346. Touch surface 346 and touch controller 342 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 346. In one implementation, touch surface 346 can display virtual or soft buttons and a virtual keyboard, which can be used as an input/output device by the user.

Other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of speaker 328 and/or microphone 330.

In some implementations, device 300 can present recorded audio and/or video files, such as MP3, AAC, and MPEG files. In some implementations, device 300 can include the functionality of an MP3 player and may include a pin connector for tethering to other devices. Other input/output and control devices can be used.

Memory interface 302 can be coupled to memory 350. Memory 350 can include high-speed random access memory or non-volatile memory, such as one or more magnetic disk storage devices, one or more optical storage devices, or flash memory (e.g., NAND, NOR). Memory 350 can store operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can include a kernel (e.g., UNIX kernel).

Memory 350 may also store communication instructions 354 to facilitate communicating with one or more additional devices, one or more computers or servers, such as communicating with servers 102, 104 through network 106. Communication instructions 354 can also be used to select an operational mode or communication medium for use by the device, based on a geographic location (obtained by the GPS/Navigation instructions 368) of the device. Memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions, including instructions for implementing the mail client and data access daemon described in reference to FIGS. 1 and 2; web browsing instructions 364 to facilitate web browsing-related processes and functions; media processing instructions 366 to facilitate media processing-related processes and functions; GPS/Navigation instructions 368 to facilitate GPS and navigation-related processes; camera instructions 370 to facilitate camera-related processes and functions; and other instructions 372. The memory 350 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 350 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). For example, the data access daemon can be accessed by another application (e.g., a notes application) using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by a mail server, the method comprising:
   receiving, by the mail server, a request for a list of mailboxes from a data access application running on a client device;
   sending, by the mail server, the list of mailboxes to the data access application;
   receiving, by the mail server, a request for push events for the mailboxes in the list from a mail client running on the client device, the mail client in communication with the data access application, the request including an account identifier and client device token identifying the client device;
   sending, by the mail server, a request for a push notification to a push notification server for the mailboxes in the list of mailboxes, the request including the account identifier and client device token;
   in response to a push notification for a changed mailbox in the list of mailboxes, receiving, by the mail server, a request from the data access application to synchronize the changed mailbox; and
   sending, by the mail server, the requested update to the data access application, where the method is performed by one or more hardware processors.

2. The method of claim 1, where the changed mailbox includes notes.

3. The method of claim 1, further comprising:
   receiving data, by the mail client, with the push notification from the push notification server, the data for indicating that notifications were retained on the push notification server.

4. The method of claim 3, further comprising:
   generating, by the mail client, local notifications for each of the retained notifications; and
   sending, by the mail client, the generated notifications to the data access application.

5. The method of claim 1, where the data access application is a daemon that is fulfilling a request by another application.

6. The method of claim 1, further comprising
   sending, by the mail client, mailbox tokens for the mailboxes in the list to the data access application;
   sending, by the mail client, the request for push events to the mail server;
   receiving, by the mail client, the push notification from the push notification server, the push notification indicating that the mailboxes in the list of mailboxes has changed; and
   sending, by the mail client, the push notification to the data access application using the mailbox tokens.

7. The method of claim 1, further comprising:
   sending, by the data access application, a request for the list of mailboxes to the mail server;
   receiving, by the data access application, the list of the mailboxes from the mail server;
   registering, by the data access application, the mailboxes with the mail client;
   receiving, by the data access application, mailbox tokens for the mailboxes from the mail client; and
   receiving, by the data access application, the push notification for the mailboxes in the list from the mail client indicating the changed mailbox; and
   using, by the data access application, a mailbox token for the changed mailbox to request the update to the changed mailbox from the mail server.

8. A system comprising:
   one or more processors;
   memory coupled to the one or more processors and configured to store instructions, which, when executed by the one or more processors, causes the one or more processors to perform operations comprising:
      receiving a request for a list of mailboxes from a data access application running on a client device;
      sending the list of mailboxes to the data access application;
      receiving a request for push events for mailboxes in the list from a mail client running on the client device, the mail client in communication with the data access application, the request including an account identifier and a client device token identifying the client device;

sending a request for a push notification to a push notification server for the mailboxes in the list of mailboxes, the request including the account identifier, the list of mailboxes and the client device token;

in response to a push notification for a changed mailbox in the list of mailboxes, receiving a request from the data access application to synchronize the changed mailbox; and sending the requested update to the data access application.

9. The system of claim 8, where the changed mailbox includes notes.

10. The system of claim 8, the memory including instructions for:

receiving, by the mail client, data with the push notification from the push notification server, the data for indicating that notifications were retained on the push notification server.

11. The system of claim 10, the memory including instructions for:

generating, by the mail client, local notifications for each of the retained notifications; and sending, by the mail client, the generated notifications to the data access application.

12. The system of claim 8, where the data access application is a daemon that is fulfilling a request by another application.

13. The system of claim 8, further comprising sending, by the mail client, mailbox tokens for the mailboxes in the list to the data access application;

sending, by the mail client, the request for push events to the mail server;

receiving, by the mail client, the push notification from the push notification server, the push notification indicating that the mailboxes in the list of mailboxes has changed; and sending, by the mail client, the push notification to the data access application using the mailbox tokens.

14. The system of claim 8, further comprising:

sending, by the data access application, a request for the list of mailboxes to the mail server;

receiving, by the data access application, the list of the mailboxes from the mail server;

registering, by the data access application, the mailboxes with the mail client;

receiving, by the data access application, mailbox tokens for the mailboxes from the mail client; and receiving, by the data access application, the push notification for the mailboxes in the list from the mail client indicating the changed mailbox; and using, by the data access application, a mailbox token for the changed mailbox to request the update to the changed mailbox from the mail server.

15. A non-transitory, computer-readable medium storage medium storing instructions, which, when executed by one or more processors, causes the one or more processors to perform operations comprising:

receiving, by a mail server, a request for a list of mailboxes from a data access application running on a client device;

sending, by the mail server, the list of mailboxes to the data access application;

receiving, by the mail server, a request for push events for mailboxes in the list from a mail client running on the client device, the mail client in communication with the data access application, the request including an account identifier and client device token identifying the client device;

sending, by the mail server, a request for a push notification to a push notification server for the mailboxes in the list of mailboxes, the request including the account identifier and client device token;

in response to a push notification for a changed mailbox in the list of mailboxes, receiving, by the mail server, a request from the data access application to synchronize the changed mailbox; and sending, by the mail server, the requested update to the data access application.

16. The non-transitory, computer-readable medium storage medium of claim 15, where the changed mailbox includes notes.

17. The non-transitory, computer-readable medium storage medium of claim 15, further comprising:

receiving, by the mail client, data with the push notification from the push notification server, the data for indicating that notifications were retained on the push notification server.

18. The non-transitory, computer-readable medium storage medium of claim 17, further comprising:

generating, by the mail client, local notifications for each of the retained notifications; and sending, by the mail client, the generated notifications to the data access application.

19. The non-transitory, computer-readable medium storage medium of claim 15, further comprising sending, by the mail client, mailbox tokens for the mailboxes in the list to the data access application;

sending, by the mail client, the request for push events to the mail server;

receiving, by the mail client, the push notification from the push notification server, the push notification indicating that the mailboxes in the list of mailboxes has changed; and sending, by the mail client, the push notification to the data access application using the mailbox tokens.

20. The non-transitory, computer-readable medium storage medium of claim 15, further comprising:

sending, by the data access application, a request for the list of mailboxes to the mail server;

receiving, by the data access application, the list of the mailboxes from the mail server;

registering, by the data access application, the mailboxes with the mail client;

receiving, by the data access application, mailbox tokens for the mailboxes from the mail client; and receiving, by the data access application, the push notification for the mailboxes in the list from the mail client indicating the changed mailbox; and using, by the data access application, a mailbox token for the changed mailbox to request the update to the changed mailbox from the mail server.

* * * * *